United States Patent [19]
Strickland

[11] Patent Number: 4,822,524
[45] Date of Patent: Apr. 18, 1989

[54] XANTHAN GUM ENHANCED FIRE-RETARDANT COMPOSITIONS

[75] Inventor: Bruce G. Strickland, Phoenix, Ariz.

[73] Assignee: Chemonics Industries, Inc., Phoenix, Ariz.

[21] Appl. No.: 177,474

[22] Filed: Apr. 1, 1988

[51] Int. Cl.$^{4}$ ........................ C09K 21/00; C09D 5/16; C09D 5/18; A62D 1/00

[52] U.S. Cl. ................................ 252/603; 106/18.16; 106/18.17; 106/18.31; 106/18.32; 106/18.33; 169/45; 252/602; 252/607; 252/610; 252/7; 47/DIG. 11

[58] Field of Search ....................... 252/2, 7, 601, 602, 252/603, 607, 608, 610, 611, 3, 8.05, 8; 428/920, 921; 106/15.05, 18.11, 18.14, 18.15, 18.16, 18.17, 18.31, 18.32, 18.33, ; 169/45; 260/DIG. 24; 435/910; 204/DIG. 1; 119/159; 47/DIG. 11; 427/421

[56] References Cited

U.S. PATENT DOCUMENTS

| | | | |
|---|---|---|---|
| 3,585,135 | 6/1971 | Smith et al. | 252/8.05 |
| 3,980,140 | 9/1976 | Matsui et al. | 169/45 |
| 4,101,485 | 7/1978 | Brooks et al. | 252/2 |
| 4,110,509 | 8/1978 | Roth | 428/276 |
| 4,390,450 | 6/1983 | Gibson et al. | 252/307 |
| 4,424,133 | 1/1984 | Mulligan | 252/8.05 |
| 4,510,081 | 4/1985 | Bronner et al. | 252/603 |
| 4,555,417 | 11/1985 | Gibson et al. | 427/361 |
| 4,610,311 | 9/1986 | Bronner et al. | 169/45 |

OTHER PUBLICATIONS

U.S. Dept. of Agriculture, *Long Term Retardant, Forest Fire Aircraft or Ground Application*, Feb. 1986, 27 pages.

*Primary Examiner*—Howard J. Locker
*Attorney, Agent, or Firm*—William H. Drummond

[57] ABSTRACT

A fire-retardant composition for application to vegetation, to suppress the spread of wildfires of the type which includes a fire-suppressing salt in a liquid carrier, has a minor amount of xanthan gum incorporated therein to improve the stability, corrosivity or adhesion of the composition.

1 Claim, No Drawings

XANTHAN GUM ENHANCED FIRE-RETARDANT COMPOSITIONS

This invention pertains to fire-retardant compositions adapted for application to vegetation to suppress the spread of wildfires.

More particularly, the invention pertains to such compositions having improved stability, adhesion characteristics and/or a reduced tendency to corrode mild steel.

In a more particular respect, the invention relates to such compositions the properties of which are enhanced to meet the requirements of certain USDA Forest Service specifications currently in effect.

The aerial application of fire-retardant compositions to prevent, inhibit or suppress the spread of wildfires is well known in the art. For example, see the U.S. Pat. No. 3,196,108 to Nelson, issued Jul. 20, 1965, No. 3,730,890 to Nelson, issued May 1, 1973, No. 3,960,735 to Lacey, issued June 1, 1976 and No. 4,176,071 to Crouch, issued Nov. 27, 1979.

According to the prior art, exemplified by the above-referenced patents, fire-suppressing and retarding salts such as, e.g., ammonium polyphosphate and the like are optionally mixed in a liquid carrier suspension or slurry with thickeners, e.g., various clays such as attapulgite, hydrated bentonite or the like, synthetic organic thickeners, e.g., carboxymethylcellulose, or naturally occurring gums. Alternatively, if the fire-retardant salt already exists in liquid form of sufficient viscosity, the thickeners can be omitted. The requirements of substantial viscosity are imposed because, when the composition is dropped from an aircraft, it is desired that the liquid mass remain substantially coherent to avoid undue dispersion of the retardant composition in the air before it strikes the ground. In this fashion, the retardant drop can be effectively targeted to cover a discrete pre-selected area or drop zone to form a fire barrier or to combat hot spots in the wildfire.

Substantial amounts of fire retardants are stored in the "ready-to-use" mixed state at tanker aircraft bases. Because of uncertainties of weather and other conditions, an aerial tanker base will typically reach the end of a fire season with very substantial amounts of mixed retardants on hand. This product must be stored and held over for use during the following year. Therefore, the product must retain a substantial amount of its original viscosity until the next fire season.

Also, because of the necessity to store substantial quantities of the mixed fire-retardant products at these air tanker bases, it is necessary to inhibit the corrosivity of mixed products to the mild steel from which the storage tanks are typically fabricated.

The principal user of such fire-retardant compositions in the United States is the U.S. Forest Service of the United States Department of Agriculture. To insure the long-term stability and corrosion characteristics of the fire-retardant compositions which it purchases and applies, the Forest Service imposes tight restrictions on these characteristics. These specifications have been published as "Specification 5100-304a" (Feb., 1986), incorporated herein by reference. These current specifications are considerably more stringent than similar specifications previous in effect. In particular, the specification for these products as to corrosion of mild steel has been set at a maximum of 5.0 mils per year as determined by the procedures set forth in the specification.

Moreover, the new 304a specification of Feb., 1986 requires that the long-term (one year) stability of mixed retardants be such that the mixed retardant exhibits less than 10% visual separation in one year and that the mixed retardant retain at least 60% of its original steady state viscosity during this period.

These requirements of corrosivity inhibition and mixed product stability are contradictory, because many of the corrosion inhibitors which are known to reduce the corrosivity of such compositions, also act to reduce the stability of the mixed compositions. It would, therefore, be highly desirable to provide a fire-retardant composition which meets the 304a specification without requiring the use of a corrosion inhibitor which will cause the mixed composition stability to fall below the stability standard set by this specification. It would be particularly desirable if the corrosion inhibitor could actually contribute to maintenance of the long-term stability of the mixed composition.

A further desirable characteristic of a fire-retardant compostion adapted for aerial application is that it have substantial visibility after the composition is dropped onto vegetation. For this reason, various dyes and pigments are commonly incorporated into such fire-retardant compositions. This enables the operator of the tanker aircraft to accurately drop successive loads of the retardant to form a fire break without extensive and wasteful overlapping of the drops and without gaps between them. Although prior art thickeners have improved the visibility of such compositions by increasing the adhesion of the pigmented retardant to the surface of the vegetation, visibility is often marginal and methods of enhancing it are continually desirable.

I have now discovered that the corrosion rate, stability and/or adhesion of typical fire-retardant compositions which contain a fire-suppression salt in a liquid carrier can be markedly improved by incorporating a minor effective amount of xanthan gum into such prior art compositions. The addition of the xanthan gum improves the long-term stability of fire-retardant compositions and, as a major side benefit, improves the adhesion of such compositions on vegetation which, in turn, leads to improved effectiveness in retarding or suppressing fires and increasing the visibility of such compositions after they have been dropped onto the vegetation. In the case of compositions containing ammonium sulfate, the corrosion characterisitics of the compositions are also improved without harming the stability of those compositions.

Xanthan gum is a natural polysaccharide gum derived by extraction from giant kelp. It is a well-known material which is used in various food products such as ice cream, salad dressings, cottage cheese, cheese spreads, bakery fillings, syrups, and in industrial products such as paints, paper coatings, adhesives, latex foams, cosmetics, abrasive suspensions, ceramics, cleaners, explosives, inks, hydro-metallurgical flocculants, and extrusion lubricants. It is non-toxic, non-irritating and is commonly approved for use as food additives.

The quantity of xanthan gum which is incorporated in the composition of the present invention will vary somewhat depending on the nature and concentration of the fire-retardant salts present, the presence and quantity of impurities, particularly metal ions in such salts, the nature of thickeners, if any, employed in such compositions and the presence of other components such as corrosion inhibitory, defoamers, anticaking agents and the like. However, the amount which must be employed to reduce the corrosivity of such compositions to acceptable level can be easily determined by routine tests carried out by those skilled in the art having regard for this disclosure. By way of illustration and not by way of limitation on the scope of the invention, I have found that incorporating from about 0.008 wt % to about 0.10 wt % of xanthan gum in the final mixed fire-retardant composition, ready for aerial application, will inhibit the corrosivity to mild steel to meet the 304a specifications while smaller amounts are partially effective and larger amounts not harmful. Such amounts also provide substantial improvements in the stability and adhesion of phosphate and sulfate-based retardants.

The xanthan gum can be suitably incorporated into the fire-retardant composition by mere mechanical mixing to insure a uniform mixture. The xanthan gum component can be incorporated into a liquid or dry "concentrate" of the composition components, suitable for field dilution, mixing, storage and application or xanthan gum can be incorporated into the final ready-to-apply mixed composition.

The following examples are presented to illustrate the presently preferred practice of the invention to those skilled in the art and not to limit the scope of the invention which is defined only by the appended claim.

EXAMPLE 1

This example illustrates the practice of the invention to improve the properties of fire-retardant compositions based on ammonium polyphosphate. A liquid concentrate is prepared containing the following components in the indicated concentrations.

| Components | Wt % |
|---|---|
| Ammonium polyphosphate | 93.0 |
| Attapulgite clay (carrier) | 4.0 |
| Sodium ferrocyanide (corrosion inhibitor) | 1.5 |
| Red Iron Oxide (coloring agent) | 1.5 |

This concentrate is then diluted with water, five (5) parts water to one (1) part concentrate by volume.

An aqueous dispersion of 40 wt % guar gum is added to the diluted concentrate to form a standard fire-retardant product having a composition of

| | Volume % |
|---|---|
| Diluted concentrate | 98.5 |
| 40% guar thickener | 1.5 |

Xanthan gum is added to this standard product with stirring to produce a uniform mixture containing 0.008 wt % xanthan gum.

Samples of the standard composition and xanthan-enhanced composition are tested to determine the adhesion to wooden dowels (simulating forest fuels) and for stability (viscosity after storage at 70° F. for 12 months).

20% more of the xanthan-enhanced sample adhered to the wooden dowels than the standard composition.

The viscosity of the xanthan-enhanced composition dropped from 1200 cps to 840 cps (an acceptable drop in viscosity) after storage, whereas the viscosity of the standard composition dropped from 1200 cps to 360 cps during the storage test. This is an excessive drop in viscosity which would cause the standard composition to fail the requirements of the 304a specification.

EXAMPLE 2

This example illustrates the practice of the invention to improve the properties of fire-retardant compositions based on ammonium sulfate. A liquid concentrate is prepared containing the following components in the indicated concentrations.

| Components | Wt % |
|---|---|
| Ammonium sulfate | 86.1 |
| Diammonium phosphate | 5.7 |
| Hydroxypropyl guar | 4.9 |
| Guar preservative | 0.6 |
| Red Iron Oxide | 0.5 |
| Sodium ferrocyanide | 1.9 |

A xanthan-enhanced formulation is also prepared which contains an additional 0.05 wt % xanthan gum.

The standard and xanthan-enhanced formulations are diluted with water and at the rate of 1.66 lbs. of the standard and enhanced formulation per gallon of water. The diluted standard and enhanced formulations are tested for adhesion, 12-month stability and corrosion, with the following results:

| | |
|---|---|
| Adhesion | 27% improvement for enhanced formula |
| Long-term stability | Enhanced formula viscosity dropped from 1550 to 1070 cps* |
| | Standard formula dropped from 1550 to 657 cps** |
| Corrosion (mils per year) | Enhanced formula 3.8* |
| | Standard formula 6.3** |

*Meets 304a specification
**Fails 304a specification

EXAMPLE 3

This example illustrates the practice of the invention to improve the properties of fire-retardant compositions based on ammonium sulfate/diammonium phosphate blend.

| Components | Wt % |
|---|---|
| Ammonium sulfate | 65.6 |
| Diammonium phosphate | 25.0 |
| Hydroxypropyl guar | 6.8 |
| Fugitive pigment | 1.0 |
| Mercaptobenzothiazole (corrosion inhibitor) | 0.8 |
| Guar preservative | 0.8 |

A xanthan-enhanced formulation is also prepared which contains 0.12 wt % xanthan gum.

The standard and xanthan-enhanced formulations are diluted with water at the rate of 1.27 lbs. of the standard and enhanced formulation per gallon of water. The diluted standard and enhanced formulations are tested for adhesion, 12-month stability and corrosion, with the following results:

| | |
|---|---|
| Adhesion | 33% improvement for enhanced formula |
| Long-term stability | Enhanced formula viscosity dropped from 1490 to 970 cps* |
| | Standard formula dropped from 1540 to 620 cps** |
| Corrosion (mils per year) | Enhanced formula 3.5* |

-continued

| Standard formula 5.7** |
| --- |

*Meets 304a specifications
**Fails 304a specifications

EXAMPLE 4

This example illustrates the practice of the invention to improve the properties of fire-retardant compositions based on diammonium phosphate.

| Components | Wt % |
| --- | --- |
| Diammonium phosphate | 89.7 |
| Hydroxypropyl guar | 7.1 |
| Guar preservative | 0.6 |
| Red Iron Oxide | 1.1 |
| Sodium silicofluoride | 0.6 |
| Mercaptobenzothiazole | 0.7 |

A xanthan-enhanced formulation is also prepared which contains 0.12 wt % xanthan gum.

The standard and xanthan-enhanced formulations are diluted with water at the rate of 1.15 lbs. of the standard and enhanced formulation per gallon of water. The diluted standard and enhanced formulations are tested for adhesion and 12-month stability with the following results:

| | |
| --- | --- |
| Adhesion | 25% improvement for enhanced formula |
| Long-term stability | Enhanced formula viscosity dropped from 1550 to 1040 cps* Standard formula dropped from 1500 to 750** |

*Meets 304a specification
**Fails 304a specification

I claim:

1. In a fire-retardant composition, specially adapted for aerial application, to suppress the spread of wildfires, said compositions consisting essentially of a fire-suppressing salt selected from the class consisting of ammonium phosphate, ammonium polyphosphate and ammonium sulfate, a guar gum thickener, and an aqueous liquid carrier, the improvement for increasing the long-term stability and adhesion characteristics of said compositions, comprising the addition of xanthan gum, in a minor amount effective to improve said characteristics.

* * * * *